(12) United States Patent
Hayton

(10) Patent No.: US 9,739,174 B2
(45) Date of Patent: Aug. 22, 2017

(54) PANEL CONNECTION SYSTEM AND A METHOD OF USING THE SAME

(71) Applicant: ROLLS-ROYCE PLC, London (GB)

(72) Inventor: Paul Robert Hayton, Bristol (GB)

(73) Assignee: ROLLS-ROYCE plc, London (GB)

( * ) Notice: Subject to any disclaimer, the term of this patent is extended or adjusted under 35 U.S.C. 154(b) by 297 days.

(21) Appl. No.: 14/665,380

(22) Filed: Mar. 23, 2015

(65) Prior Publication Data

US 2015/0292360 A1    Oct. 15, 2015

(30) Foreign Application Priority Data

Apr. 14, 2014  (GB) .................................. 1406630.2

(51) Int. Cl.
| | |
|---|---|
| *F01D 25/24* | (2006.01) |
| *F02K 1/80* | (2006.01) |
| *F04D 29/40* | (2006.01) |

(52) U.S. Cl.
CPC .............. *F01D 25/24* (2013.01); *F02K 1/80* (2013.01); *F04D 29/403* (2013.01); *F05D 2260/941* (2013.01); *Y02T 50/672* (2013.01)

(58) Field of Classification Search
CPC .......... F01D 25/24; F02K 1/80; F04D 29/403; F05D 2260/941; F16B 5/00; F16B 5/0012;

(Continued)

(56) References Cited

U.S. PATENT DOCUMENTS 1,165,155 A * 12/1915 Cordes .................. E06B 3/9845
                                                       403/294
2,142,896 A *  1/1939 Harman .................. E01B 11/28
                                                       238/219

(Continued)

FOREIGN PATENT DOCUMENTS

| EP | 0 261 094 A2 | 3/1988 |
| GB | 11327 | 0/1908 |
| WO | 01/63078 A1 | 8/2001 |

OTHER PUBLICATIONS

Aug. 28, 2015 Search Report issued in European Patent Application No. 15 16 0229.

(Continued)

*Primary Examiner* — Dwayne J White
*Assistant Examiner* — Aaron R Eastman
(74) *Attorney, Agent, or Firm* — Oliff PLC

(57) ABSTRACT

A panel connection assembly connects a panel to a casing including hanger, first locating, and second locating plates. The hanger plate has elongate body, first end, and opposite second end portions, with each of the first and second end portions having a circular profile. The hanger plate has a dumbbell shape. The first locating plate has a first circular locating aperture, the first locating aperture to accommodate the first end portion, and the second locating plate has a second circular locating aperture, the second locating aperture to accommodate the second end portion. In use, the first locating plate is secured to the casing, the second locating plate is secured to the panel, the first and second end portions are respectively accommodated within the first and second locating apertures with the elongate body portions extending therefrom, to connect the panel to the casing.

11 Claims, 7 Drawing Sheets

(58) Field of Classification Search
CPC ...... F16B 5/002; F16B 5/0024; F16B 5/0028; F16B 5/0044; F16B 5/0048; F16B 5/0052; F16B 5/0068; F16B 5/0072; F16B 5/0216; F16B 5/0225; F16B 5/0233; F16B 5/025; F16B 5/0621; F16B 5/0628; F16B 5/065; Y10T 403/32081
See application file for complete search history.

(56) References Cited

U.S. PATENT DOCUMENTS

| | | | | |
|---|---|---|---|---|
| 3,962,827 | A * | 6/1976 | Chaffee | E05D 1/04 16/239 |
| 4,785,565 | A * | 11/1988 | Kuffner | A47F 5/105 160/135 |
| 5,339,576 | A * | 8/1994 | Fussler | E04B 2/7429 160/135 |
| 5,502,930 | A * | 4/1996 | Burkette | E04B 2/7429 16/225 |
| 6,345,927 | B1 * | 2/2002 | Pao | G21C 13/087 403/294 |
| 6,409,473 | B1 * | 6/2002 | Chen | F01D 5/225 415/191 |
| 6,546,675 | B1 * | 4/2003 | Adderton | E04B 2/7435 160/135 |
| 2009/0077978 | A1 * | 3/2009 | Figueroa | F02C 7/20 60/766 |
| 2009/0293498 | A1 | 12/2009 | Petty et al. | |
| 2009/0317175 | A1 * | 12/2009 | Martinez | F02K 1/80 403/24 |
| 2013/0318979 | A1 | 12/2013 | Kramer et al. | |
| 2014/0047848 | A1 | 2/2014 | Peters | |
| 2014/0090399 | A1 | 4/2014 | McAlice et al. | |
| 2014/0230246 | A1 | 8/2014 | McMahon et al. | |

OTHER PUBLICATIONS

Oct. 29, 2014 Search Report issued in British Application No. 1406630.2.

* cited by examiner

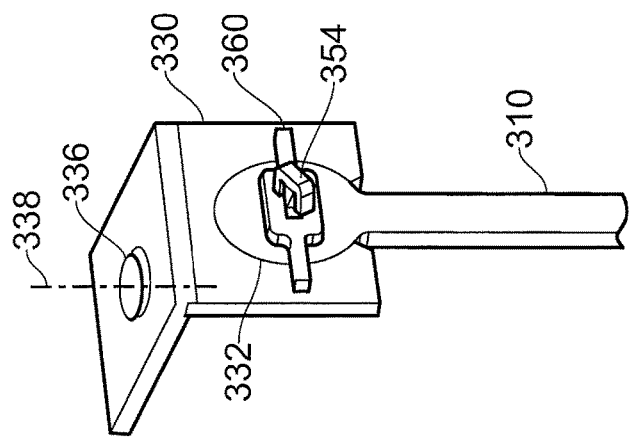
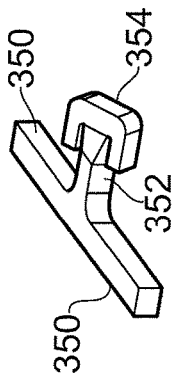
FIG. 5
FIG. 6
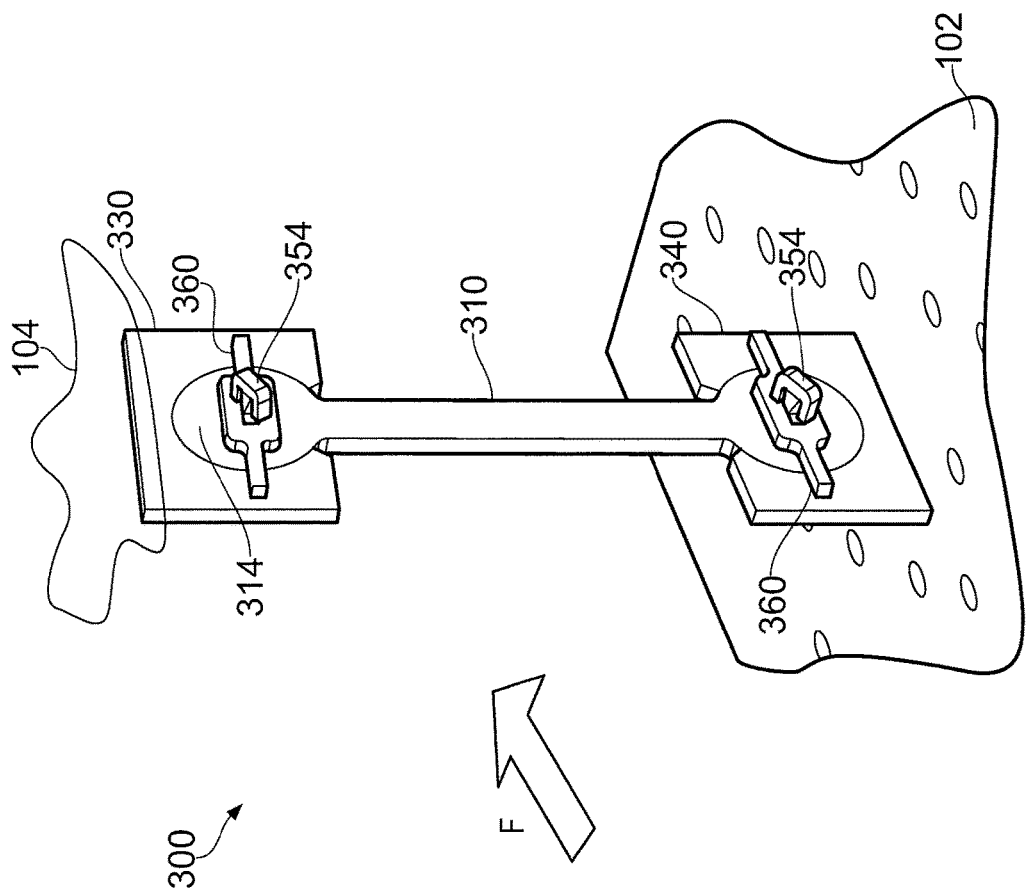
FIG. 4

PANEL CONNECTION SYSTEM AND A METHOD OF USING THE SAME

This disclosure claims the benefit of UK Patent Application No. 1406630.2, filed on 14 Apr. 2014, which is hereby incorporated herein in its entirety.

FIELD OF THE INVENTION

The present invention relates to a panel connection system and particularly, but not exclusively, to a panel connection system for an exhaust gas duct.

BACKGROUND TO THE INVENTION

The exhaust duct for a gas turbine engine is conventionally a circular duct which connects to the turbine stage outlet of the engine. The use of a circular duct is convenient since it can be readily connected to the turbine outlet of the engine. In addition, thermal expansion of the exhaust duct resulting from the heat of the exhaust gas flow may be readily accommodated by the radial growth of the exhaust duct.

However, in many gas turbine engine installations it is desirable for the exit portion of the exhaust duct to be non-circular because this can make the mechanical installation of the exhaust duct into its supporting structure easier and more convenient.

In particular it is advantageous for the exhaust duct to be rectilinear in cross-section to facilitate the mounting of the exhaust duct within its surrounding structure.

Due to the need to accommodate dimensional changes in the exhaust duct resulting from the hot exhaust gases passing through the exhaust duct it is known to provide a duct mounting arrangement that independently accommodates both axial and lateral growth of the exhaust duct resulting from thermal expansion of the duct. Such mounting arrangements are required to accommodate movement of the duct both axially and laterally and can be mechanically complicated.

It is an object of the present invention to provide a mounting arrangement for a non-circular cross-section exhaust duct that supports the exhaust duct.

Previous jet pipe liner hanger systems have used expensive machined parts to control exhaust duct liner location and require a high number of part variations, making the assembly complicated. Furthermore, large numbers of hangers can obstruct the airflow passing between surfaces, impacting the effectiveness of the air supply.

STATEMENTS OF INVENTION

According to a first aspect of the present invention there is provided a panel connection assembly for connecting a panel to a casing, the panel connection assembly comprising:
  a hanger plate;
  a first locating plate; and
  a second locating plate;
  whereby the hanger plate comprises an elongate body portion, a first end portion, and an opposite second end portion, each of the first end portion and second end portion having a circular profile, the hanger plate thereby having a dumbbell shape, and the first locating plate comprises a first circular locating aperture, the first locating aperture being dimensioned to accommodate the first end portion, the second locating plate comprises a second circular locating aperture, the second locating aperture being dimensioned to accommodate the second end portion, and
  wherein, in use, the first locating plate is secured to the casing, the second locating plate is secured to the panel, the first end portion is accommodated within the first locating aperture with the elongate body portion extending therefrom, and the second end portion is accommodated within the second locating aperture with the elongate body portion extending therefrom, to connect the panel to the casing.

The panel connection assembly of the invention allows relative movement between a panel and a casing whilst maintaining a connection therebetween. In other words, the panel can be maintained at an approximately constant distance from the casing whilst allowing for relative movement resulting from, for example, thermal expansion of the panel or the casing.

By forming the hanger plate and the first and second locating plates from sheet material, the panel connection assembly of the invention is simple and cost effective to manufacture. It is also straightforward to assemble and maintain. This makes the assembly attractive to a user.

In one arrangement, the hanger plate has a symmetrical profile with the first end portion and the second end portion being mirror images of one another, and the first and second locating plates are identical to one another. This makes the assembly of the invention cost effective to manufacture, and simple to assemble.

In other arrangements of the invention, the first end portion is dimensioned differently to the second end portion. Such an approach may be necessary in order to accommodate the connection assembly around other hardware.

Optionally, the hanger plate has a first surface and an opposite second surface, first and second retaining plates being positioned over the first and second surfaces respectively of each of the first and second end portions, each of the first and second retaining plates having a dimension greater than the diameter of the corresponding first or second locating aperture, each of the first end portion and the second end portion comprising a securing aperture positioned at a centre of the respective circular profile, corresponding ones of the first and second retaining plates being connected together by a fastener, the fastener extending through the respective securing aperture.

The retaining plates prevent the hanger plate from becoming detached from the locating plates should the assembly be subject to any lateral misalignment. This makes the connection assembly of the invention robust and tolerant to lateral misalignment.

Optionally, the first and second retaining plates are circular, the diameter of each of the first and second retaining plates being greater than the diameter of the corresponding first or second locating aperture.

The use of circular retaining plates allows for their simple and inexpensive manufacture, for example by stamping from sheet material.

Optionally, the first and second retaining plates are elongate, a length of each of the first and second retaining plates being greater than the diameter of the corresponding first or second locating aperture.

By forming the retaining plates as elongate parts it is possible to reduce their weight over a circular retaining plate. This makes elongate retaining plates more attractive for use in weight critical applications.

Optionally, the fastener comprises a projection extending laterally from a midpoint of the first retaining plate, with a deformable tab being superposed atop the projection, the second retaining plate comprises a tab slot at a mid-point thereon, the securing aperture being dimensioned to accommodate the deformable tab, and, in use, the deformable tab extends through the securing aperture and through a slot in the second retaining plate, with the deformable tab being rotated relative to the projection to secure the first and second retaining plates together.

The use of a deformable tab to secure the fastener in a 'closed' position is both simple and cost effective for a user. This makes the fastener simple, and quick to install which makes the connection assembly attractive for a user.

Optionally, the fastener is a threaded fastener comprising a threaded rod and a nut, the threaded rod is attached to the first retaining plate, and, in use, the threaded rod extends through the securing aperture and through a hole in the second retaining plate, with the nut being threadingly attached to the threaded rod to secure the first and second retaining plates together.

A conventional threaded fastener, such as a captive threaded rod and a nut, or a bolt and a nut may alternatively be used to secure the first and second retaining plates on respective sides of the end portions of the hanger plate. The use of threaded fasteners do not provide for the potential weight advantages of the deformable tab fastener arrangement described above, but they are more widely available and easily replaced in a service setting.

Optionally, the diameter of the circular profile of the first end portion is between approximately 200% to 300% of a width of the elongate body portion.

Since it is the first and second end portions that are located by respective ones of the first and second locating plates, it is the contact surface between the end portion and the locating plate that supports the load that is transferred through the connection assembly from the panel to the casing.

Consequently, the diameter of the circular profile of the end portion is greater than the lateral dimension (i.e. the width) of the elongate body portion of the hanger plate. This enables the load transferred through the hanger plate from the panel to the casing to the spread over a larger area and thence the stress experienced in the hanger plate to be reduced. This improves the durability and service life of the connection assembly of the invention.

Optionally, the diameter of the circular profile of the second end portion is between approximately 200% to 300% of a width of the elongate body portion.

The use of a circular profile of an end portion whose diameter is two to three times the lateral width of the elongate body portion of the hanger plate reduces the stress experienced by the hanger plate. This improves the reliability and extends the service life of the connection assembly of the invention.

Optionally, at least one of the first end portion and the second end portion is truncated at its distal end.

This reduces the weight of the hanger plate while not compromising the load carrying ability of the connection assembly since it is the contact surfaces proximal to the elongate body portion that are subjected to the loads transferred through the hanger plate.

Optionally, each of the first locating plate and the second locating plate comprises a protrusion, the protrusion projecting radially inwardly of the circular profile.

This provides a measure of 'self centering' force to the hanger plate when it is installed into the locating plate in conjunction with the truncation of the corresponding end portion of the hanger plate.

According to a second aspect of the present invention there is provided a panel connection system comprising:
a casing;
a panel; and
a plurality of panel connection assemblies according to a first aspect of the invention;
wherein each of the first locating plates is attached to the casing, each of the second locating plates is attached to the panel, each of the first end portions is located within corresponding ones of the first locating apertures, and each of the second end portions is located within corresponding ones of the second locating apertures, to connect the panel to the casing.

Since the panel connection assembly of the invention is formed from sheet metal components it may easily be incorporated into a panel connection system.

Optionally, each of the plurality of panel connection assemblies is oriented such that the respective hanger plates are coplanar.

In one arrangement of the invention, the space between the panel and the casing is used to accommodate a gas flow. When the panel is part of an exhaust system, for example of a gas turbine engine, is can become extremely hot due to heat transfer from the exhaust gases. This can result in thermal expansion of the panel which in extreme situations may distort, buckle or even fracture the panel.

It may therefore be necessary or desirable to circulate a cooling air or gas flow between the panel and the casing. By aligning the plurality of connection assemblies so that the hanger plates are all coplanar it is possible to minimise the flow disturbance caused by the connection assemblies. This makes the system of the invention more efficient and so more attractive to a user.

According to a third aspect of the present invention there is provided a exhaust system for a gas turbine engine comprising a panel connection system according to a second aspect of the invention.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which:

FIG. 4 shows a perspective view of a panel connection assembly according to a third embodiment of the invention;

FIG. 5 shows a partial view of one end of the assembly of FIG. 4;

FIG. 6 shows a perspective view of the first retaining plate of the assembly of FIG. 4;

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
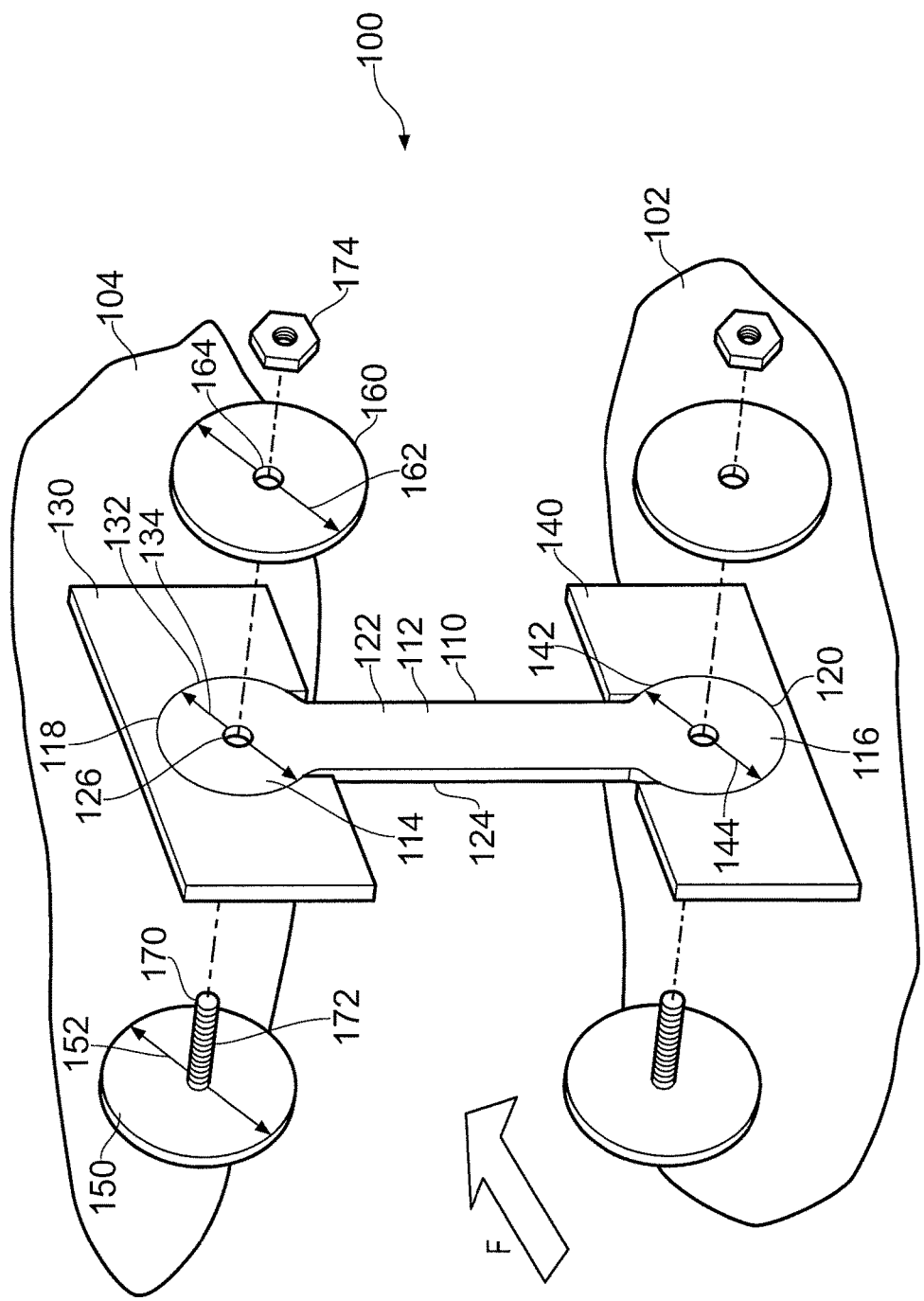
FIG. 1 shows an exploded perspective view of a panel connection assembly according to a first embodiment of the invention.

Referring to FIG. 1, a panel connection assembly according to a first embodiment of the invention is designated generally by the reference numeral 100. The panel connection assembly 100 is intended for use in connecting a panel 102 to a casing 104. In the particular embodiments described below the panel 102 is an exhaust system (not shown) of a gas turbine engine (not shown) for use in an aerospace application, for example as an aircraft powerplant. The exhaust gas flow F is indicated by an correspondingly marked arrow in the figures.

The panel connection assembly 100 comprises a hanger plate 110, a first locating plate 130 and a second locating plate 140. The hanger plate 110 comprises an elongate body portion 112, a first end portion 114 and an opposite second end portion 116. Each of the first end portion 114 and the second end portion 116 has a circular profile 118,120. Consequently, the hanger plate 110 has a dumbbell shape.

The hanger plate 110 is made from a sheet metal stamping or pressing. In this embodiment, the hanger plate 110 is formed from a titanium alloy sheet material. In other arrangements of the invention the hanger plate 110 may be formed from any suitable sheet metal or metal alloy.

The first locating plate 130 comprises a first circular locating aperture 132 extending through the body of the first locating plate 130. The first circular locating aperture 132 has a diameter 134. The first circular locating aperture 132 intersects with an edge of the first locating plate 130 to thereby have an opening along this edge.

The first circular locating aperture 132 is dimensioned to accommodate the first end portion 114 of the hanger plate 110. In other words, the first end portion 114 of the hanger plate 110 is enclosed by the first circular locating aperture 132 of the first locating plate 130 with the elongate body portion 112 of the hanger plate 110 protruding from the opening along the edge of the first locating plate 130.

The shoulder or corner portions of the edge of the first locating plate 130 at either side of the opening are relieved, or cut away, to provide for a greater range of relative angular movement between the hanger plate 110 and the first locating plate 130.

The second locating plate 140 comprises a second circular locating aperture 142 extending through the body of the second locating plate 140. The second circular locating aperture 142 has a diameter 144. The second circular locating aperture 142 intersects with an edge of the second locating plate 140 to thereby have an opening along this edge.

The second circular locating aperture 142 is dimensioned to accommodate the second end portion 116 of the hanger plate 110. In other words, the second end portion 116 of the hanger plate 110 is enclosed by the second circular locating aperture 142 of the second locating plate 140 with the elongate body portion 112 of the hanger plate 110 protruding from the opening along the edge of the second locating plate 140.

The shoulder or corner portions of the edge of the second locating plate 140 at either side of the opening are relieved, or cut away, to provide for a greater range of relative angular movement between the hanger plate 110 and the second locating plate 140.

Both the first locating plate 130 and the second locating plate 140 are formed as sheet metal stampings or pressings. In the present embodiment the first locating plate 130 and the second locating plate 140 are formed from a titanium alloy sheet material. In other arrangements of the invention the first locating plate 130 and the second locating plate 140 may be formed from any suitable sheet metal or metal alloy.

The hanger plate 110 has a first surface 122 and an opposite second surface 124.

Each of the first end portion 114 and the second end portion 116 has a securing aperture 126 located at a mid-point thereon. In the present embodiment the securing aperture 126 takes the form of a circular hole extending through the thickness of the respective first end portion 114 and second end portion 116.

The panel connection assembly 100 further comprises, at each of the first end portion 114 and the second end portion 116, a first retaining plate 150 and a second retaining plate 160. In this embodiment the first and second retaining plates 150, 160 take the form of circular discs formed from a sheet metal stamping or pressing. In other arrangements the first and second retaining plates 150, 160 may take the form of another suitable material, for example another metal or metal alloy or a plastic or fibre-reinforced composite material.

The first retaining plate 150 is positioned against a first surface 122 of the first end portion 114 with the second retaining plate 160 being positioned against a second surface 124 of the first end 114.

Each of the first retaining plate 150 and the second retaining plate 160 has a diameter 152,162 that is larger than the diameter 134 of the first locating plate 130. Consequently, once the first retaining plate 150 and the second retaining plate 160 are assembled on either side of the hanger plate 110 the increased diameter of the retaining plates 150,160 retain or 'trap' the hanger plate 110 within the first locating plate 130.

With the first retaining plate 150 and second retaining plate 160 positioned on either side of the first end 114, a fastener 170 is used to secure the first retaining plate 150 and second retaining plate 160 to one another. In the present embodiment the fastener 170 takes the form of the threaded rod 172 that is secured to the first retaining plate 150 and a nut 174. The threaded rod 172 extends through the securing aperture 126 and then through the corresponding hole 164 in the second retaining plate 160 with the nut 174 securing the components to one another.

In the present embodiment a similar structure is employed at the second end portion 116 with respect to first and second retaining plates 150,160. In other arrangements the first and second retaining plates 150, 160 at the first end 114 may be dimensioned differently to the first and second retaining plates 150, 160 at the second end 116.

The diameter of the circular profile 118 of the first end portion 114 is approximately 300% of the width of the elongate body portion 112 of the hanger plate 110. In other arrangements the diameter of the circular profile 118 may be between approximately 200% to 300% of the width of the elongate body portion 112.

Figure 2:
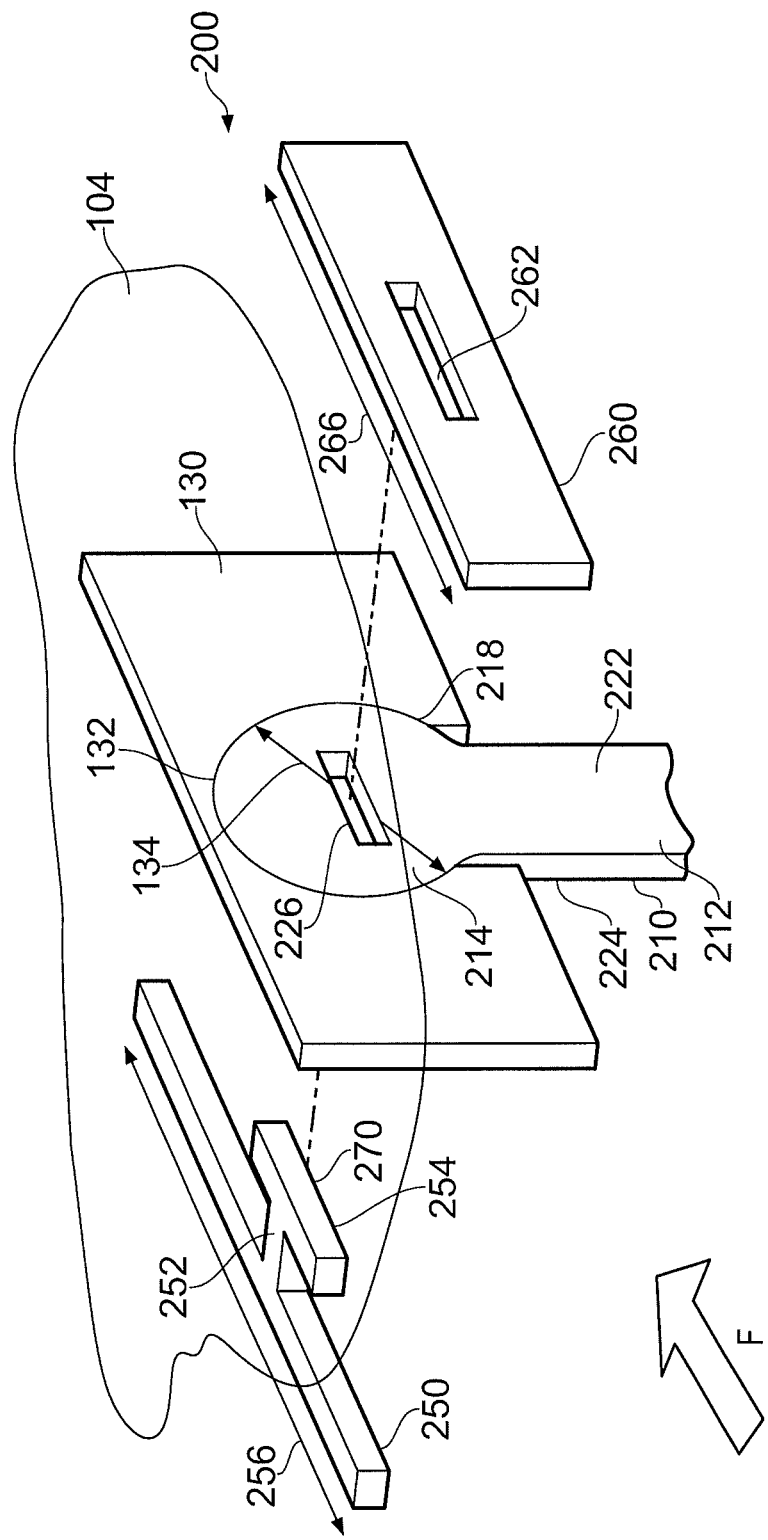
FIG. 2 shows an exploded perspective partial view of a panel connection assembly according to a second embodiment of the invention.
Figure 3:
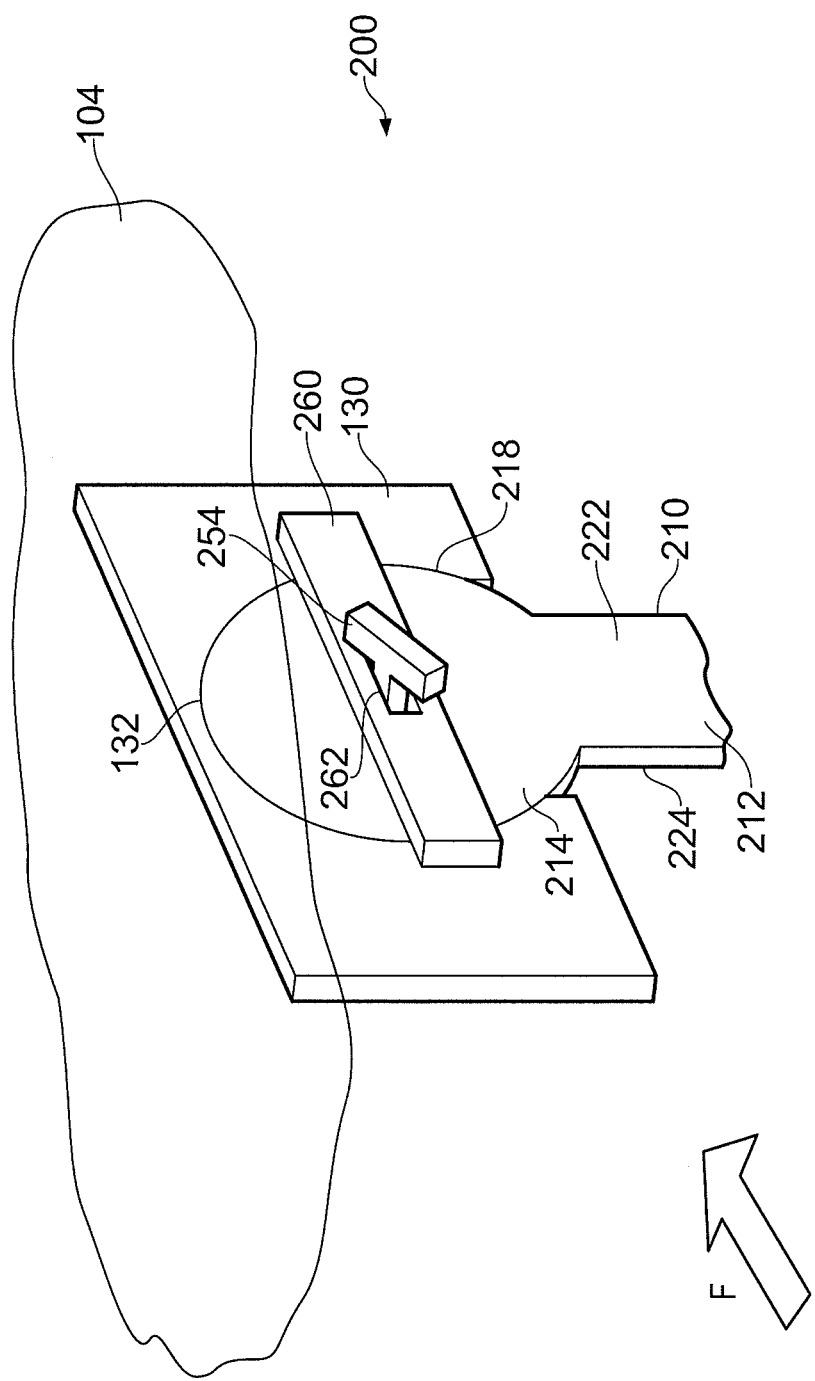
FIG. 3 shows the panel connection assembly of FIG. 2 in an assembled state.

Referring to FIGS. 2 and 3, a panel connection assembly according to a second embodiment of the invention is designated generally by the reference numeral 200. Features of the apparatus 200 which correspond to those of apparatus 100 have been given corresponding reference numerals for ease of reference.

The panel connection assembly 200 comprises a hanger plate 210, a first locating plate 130 and a second locating plate 140. The hanger plate 210 comprises an elongate body portion 212, a first end portion 214 and an opposite second end portion 216. Each of the first end portion 214 and the second end portion 216 has a circular profile 218,220. Consequently, the hanger plate 210 has a dumbbell shape.

The structure and function of the first and second locating plates 130,140 are identical to that described above with regard to the first embodiment of the invention.

The hanger plate 210 has a first surface 222 and an opposite second surface 224.

Each of the first end portion 214 and the second end portion 216 has a securing aperture 226 located at a midpoint thereon. In this embodiment the securing aperture 226 takes the form of a rectangular slot extending through the respective first end portion 214 and second end portion 216.

The panel connection assembly 100 further comprises, at each of the first end portion 214 and the second end portion 216, a first retaining plate 250 and a second retaining plate 260. In this embodiment the first retaining plate 250 takes the form of an elongate member having a projection 252 extending laterally from a mid-point of the elongate member 250. The projection 252 is superposed by a deformable tab 254. The deformable tab 254 extends substantially parallel to the elongate member. The second retaining plate 260 is formed as an elongate rectangular plate having a rectangular tab slot 262 at a mid-point thereon. The tab slot 262 is dimensioned to accommodate the deformable tab 254 of the first retaining plate 250.

In this arrangement, each of the first retaining plate 250 and the second retaining plate 260 is formed as a sheet metal stamping or pressing. In this embodiment the first retaining plate 250 and the second retaining plate 260 are formed from a titanium alloy sheet material. In other arrangements the first retaining plate 250 and the second retaining plate 260 may be formed from any suitable material, such as another metal or metal alloy.

The first retaining plate 250 is positioned against a first surface 222 of the first end portion 214 with the second retaining plate 260 being positioned against a second surface 224 of the first end 214.

Each of the first retaining plate 250 and the second retaining plate 260 has an elongate length 256,266 that is larger than the diameter 134 of the first locating plate 130. Consequently, once the first retaining plate 250 and the second retaining plate 260 are assembled on either side of the hanger plate 110 the increased elongate length 256,266 of the retaining plates 250,260 retain or 'trap' the hanger plate 210 within the first locating plate 130.

With the first retaining plate 250 and second retaining plate 260 positioned on either side of the first end 214, a fastener 270 is used to secure the first retaining plate 150 and second retaining plate 160 to one another. In this embodiment the fastener 270 takes the form of the deformable tab 254 that is integrally formed with the first retaining plate 250. The deformable tab 254 passes through the securing aperture 226 in the first end 214 and then through the corresponding tab slot 262 in the second retaining plate 160. The deformable tab 254 can then be deformed by rotation relative to the projection 252. This results in the deformable tab 254 being misaligned relative to the tab slot 262 and thus locks the first retaining plate 150 and the second retaining plate 160 to one another.

In this embodiment a similar structure is employed at the second end portion 216 with respect to first and second retaining plates 250,260. In other arrangements the first and second retaining plates 250, 260 at the first end 214 may be dimensioned differently to the first and second retaining plates 250, 160 at the second end 216.

The diameter of the circular profile 218 of the first end portion 214 is approximately 300% of the width of the elongate body portion 212 of the hanger plate 210. In other arrangements the diameter of the circular profile 218 may be between approximately 200% to 300% of the width of the elongate body portion 212.

Referring to FIGS. 4, 5 and 6, a panel connection assembly according to a third embodiment of the invention is designated generally by the reference numeral 300. Features of the apparatus 300 which correspond to those of apparatus 100 have been given corresponding reference numerals for ease of reference.

The panel connection assembly 300 corresponds closely to the panel connection assembly 200 with some minor differences that are described below.

The differences between the panel connection assembly 300 and the panel connection assembly 200 relate to the geometry of the first and second retaining plates 350,360.

In this embodiment the distal portions of each of the first and second retaining plates 350,360 are laterally thinned where they extend over the surface of the corresponding first and second locating plates 330,340.

Figure 7:
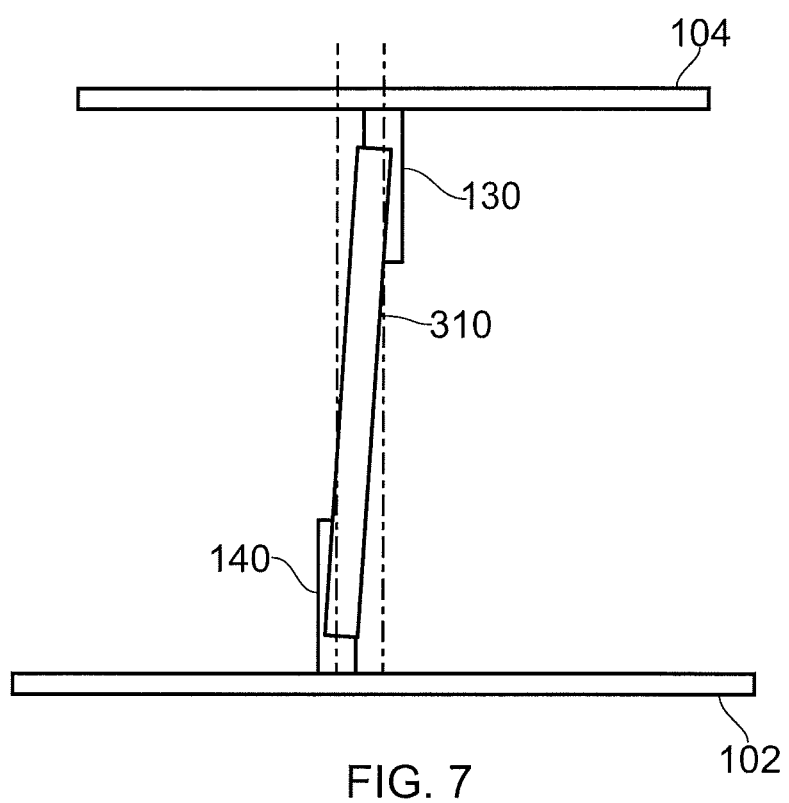
FIG. 7 shows a sectional end view of the assembly of FIGS. 1 to 6.

This feature allows the hanger plate 310 to pivot in the 'out of plane' direction as shown in FIG. 7. This movement enables the panel connection assembly 300 to accommodate lateral or sideways thermal growth.

Figure 8A:
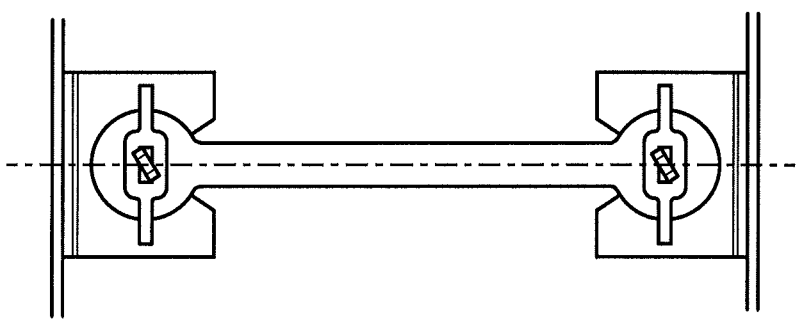
FIG. 8A shows the assembly of FIG. 4 in a 'cold' state.
Figure 8B:
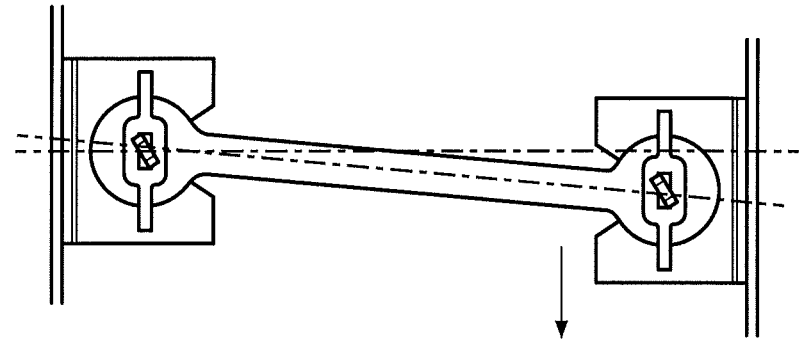
FIG. 8B shows the assembly of FIG. 8A in a 'hot' state, i.e. accommodating thermal expansion.
Figure 10:
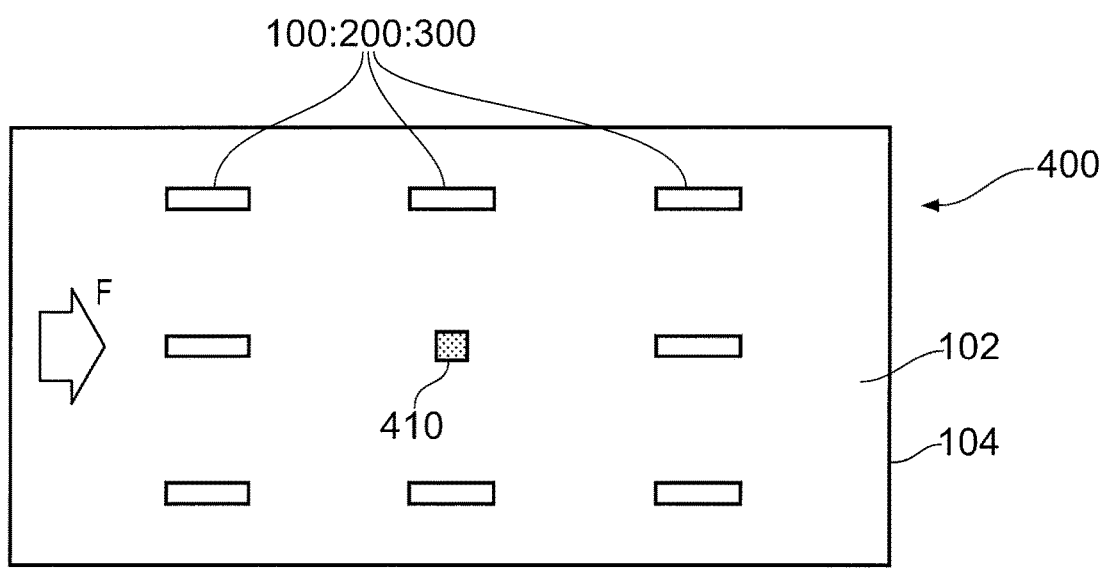
FIG. 10 shows a schematic plan view of a panel connection system according to a second aspect of the invention.

In one arrangement the panel connection assembly 100, 200,300 is installed such that the axis of the hanger plate 110,210,310 is substantially normal to the surfaces of both the panel 102 and the casing 104 (see FIG. 8A). In such a scenario, when thermal growth of the panel 102 occurs the hanger plate 110,210,310 will move relative to both the panel 102 and the casing 104, to the position shown in FIG. 8B.

Figure 9A:
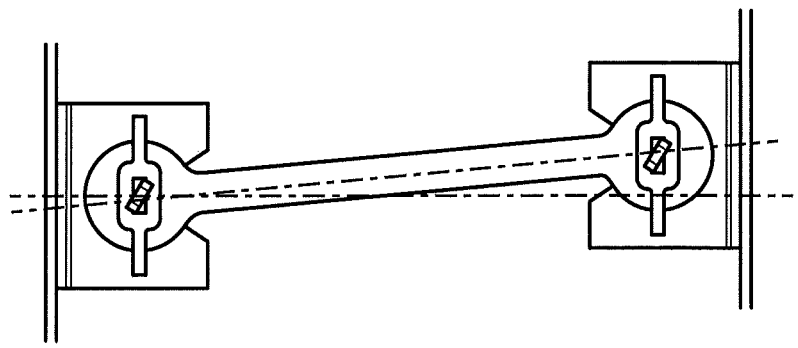
FIG. 9A shows the assembly of FIG. 4 in a 'cold' state with an initial offset.
Figure 9B:
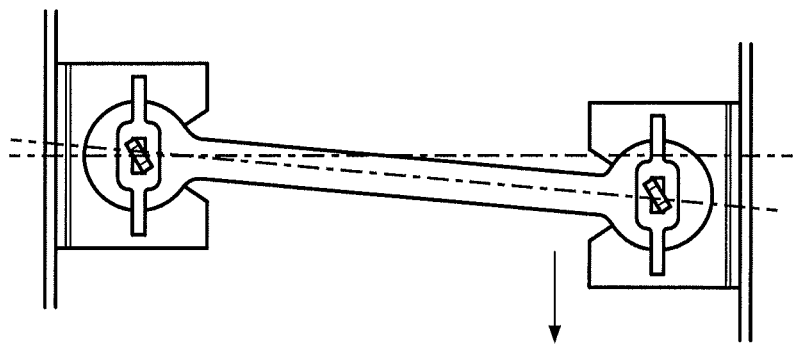
FIG. 9B shows the assembly of FIG. 9A in a 'hot' state, i.e. accommodating thermal expansion.

In an alternative arrangement, it may be advantageous to distribute the movement resulting from thermal growth of the assembly around the nominal or centre position. This may be achieved by introducing an angular offset to the orientation of the hanger plate 110,210,310 when in the initial or 'cold' position (shown in FIG. 9A). This results in the relative rotational movement of the hanger plate 110, 210,310 being divided either side of the orientation shown in FIG. 8A. FIG. 9B shows the resulting 'hot' position of the hanger plate 110,210,310.

Referring to FIG. 9, a panel connection system according to a second aspect of the invention is designated generally by the reference numeral 400. Features of the panel connection system 300 which correspond to those of panel connection assembly 100:200:300 have been given corresponding reference numerals for ease of reference.

FIG. 9 shows a schematic plan view of a panel connection system 400 comprising a panel, 102, a casing 104 and a plurality of panel connection assemblies 100:200:300.

A single fixed mounting point 410 is employed to rigidly connect the panel 102 to the casing 104 at a geometric centre of the panel 102 and casing. 104.

Each of the plurality of panel connection assemblies 100:200:300 is oriented such that the respective hanger plates 110:210:310 are all co-planar and parallel to the flow direction F of the gas flowing between the panel 102 and the casing 104.

This coplanar arrangement of the panel connection assemblies 100:200:300 minimises flow disruption resulting from the gas flow impinging on any 'out of plane' hanger plates panel connection assemblies 100:200:300.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. A panel connection assembly for connecting a panel to a casing, the panel connection assembly comprising:
    a hanger plate;
    a first locating plate; and
    a second locating plate;
    whereby the hanger plate comprises an elongate body portion, a first end portion, and an opposite second end portion, each of the first end portion and second end portion having a circular profile, the hanger plate thereby having a dumbbell shape, and the first locating plate comprises a first circular locating aperture, the first locating aperture being dimensioned to accommodate the first end portion, the second locating plate comprises a second circular locating aperture, the second locating aperture being dimensioned to accommodate the second end portion,
    wherein, in use, the first locating plate is secured to the casing, the second locating plate is secured to the panel, the first end portion is accommodated within the first locating aperture with the elongate body portion extending therefrom, and the second end portion is accommodated within the second locating aperture with the elongate body portion extending therefrom, to connect the panel to the casing, and
    wherein the hanger plate having a first surface and an opposite second surface, first and second retaining plates being positioned over the first and second surfaces respectively of each of the first and second end portions, each of the first and second retaining plates having a dimension greater than the diameter of the corresponding first or second locating aperture, each of the first end portion and the second end portion comprising a securing aperture positioned at a center of the respective circular profile, corresponding ones of the first and second retaining plates being connected together by a fastener, the fastener extending through the respective securing aperture.

2. The panel connection assembly as claimed in claim 1, wherein the first and second retaining plates are circular, the diameter of each of the first and second retaining plates being greater than the diameter of the corresponding first or second locating aperture.

3. The panel connection assembly as claimed in claim 1, wherein the first and second retaining plates are elongate, a length of each of the first and second retaining plates being greater than the diameter of the corresponding first or second locating aperture.

4. The panel connection assembly as claimed in claim 1, wherein the fastener comprises a projection extending laterally from a midpoint of the first retaining plate, with a deformable tab being superposed atop the projection, the second retaining plate comprises a tab slot at a mid-point thereon, the securing aperture being dimensioned to accommodate the deformable tab, and, in use, the deformable tab extends through the securing aperture and through a slot in the second retaining plate, with the deformable tab being rotated relative to the projection to secure the first and second retaining plates together.

5. The panel connection assembly as claimed in claim 1, wherein the fastener is a threaded fastener comprising a threaded rod and a nut, the threaded rod is attached to the first retaining plate, and, in use, the threaded rod extends through the securing aperture and through a hole in the second retaining plate, with the nut being threadingly attached to the threaded rod to secure the first and second retaining plates together.

6. The panel connection assembly as claimed in claim 1, wherein the diameter of the circular profile of the first end portion is between approximately 200% to 300% of a width of the elongate body portion.

7. The panel connection assembly as claimed in claim 1, wherein the diameter of the circular profile of the second end portion is between approximately 200% to 300% of a width of the elongate body portion.

8. The panel connection assembly as claimed in claim 1, wherein each of the first locating plate and the second locating plate comprises a protrusion, the protrusion projecting radially inwardly of the circular profile.

9. A panel connection system comprising:
    a casing;
    a panel; and
    a plurality of panel connection assemblies as claimed in claim 1;
    wherein each of the first locating plates is attached to the casing, each of the second locating plates is attached to the panel, each of the first end portions is located within corresponding ones of the first locating apertures, and each of the second end portions is located within corresponding ones of the second locating apertures, to connect the panel to the casing.

10. The panel connection system as claimed in claim 9, wherein each of the plurality of panel connection assemblies is oriented such that the respective hanger plates are coplanar.

11. An exhaust system for a gas turbine engine comprising the panel connection system as claimed in claim 9.

* * * * *